UNITED STATES PATENT OFFICE 2,571,586

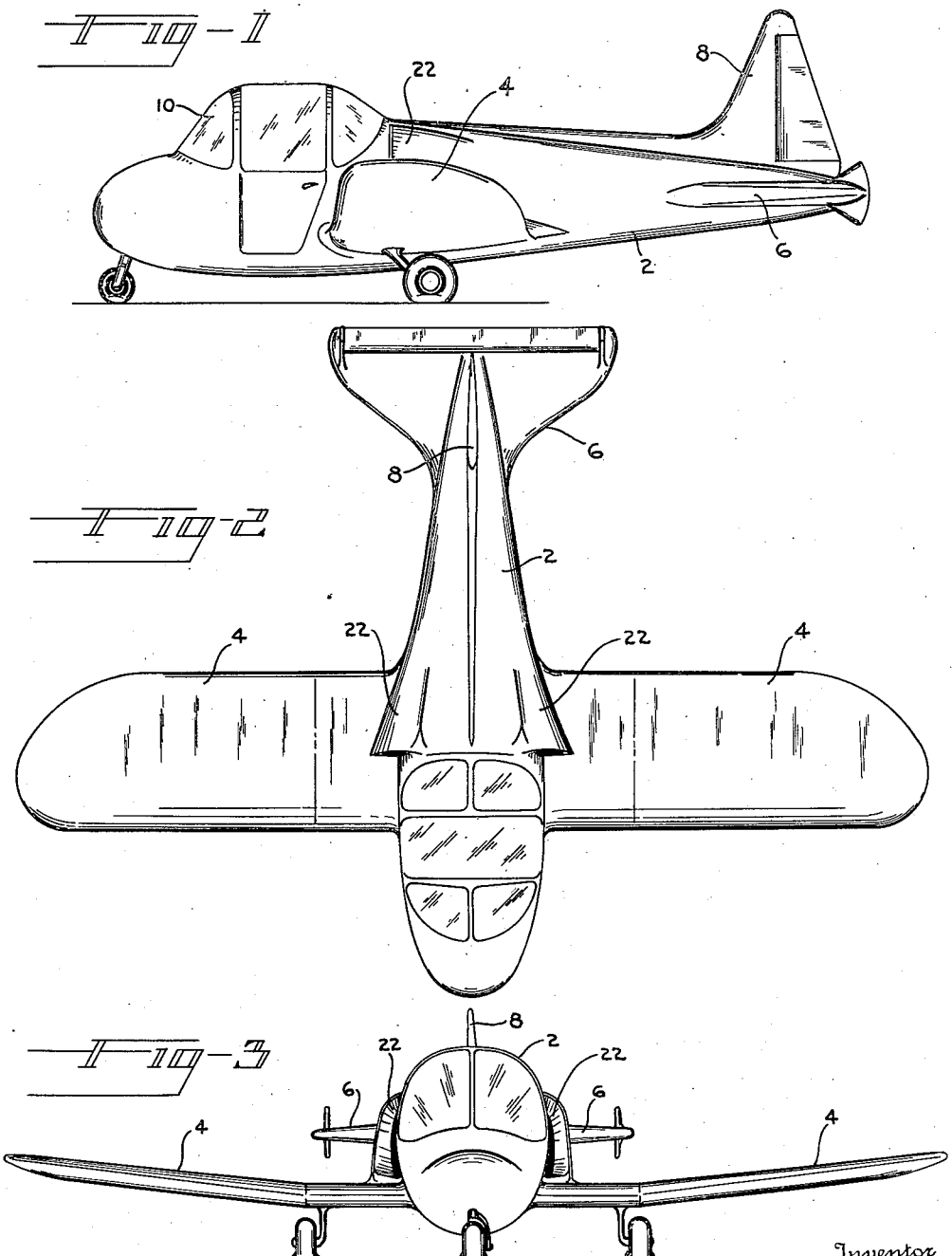

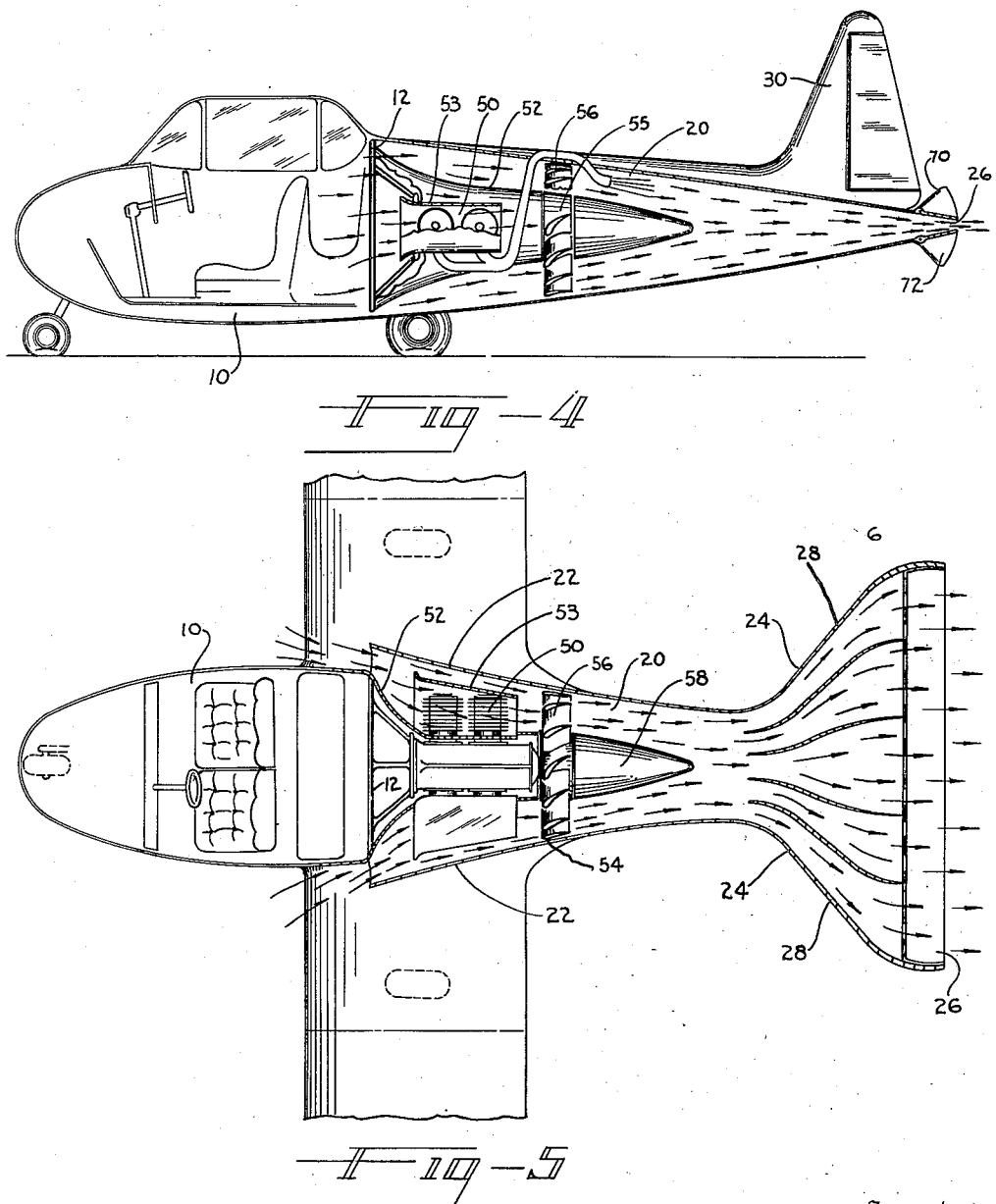

AIRCRAFT OF THE REACTION PROPULSION TYPE

Frank B. Lane, Silver Spring, Md., assignor to Engineering and Research Corporation, Riverdale, Md., a corporation of Maryland Application May 24, 1946, Serial No. 671,946

1 Claim. (Cl. 244—57)

This invention relates to the reaction propulsion of aircraft and is more particularly intended to provide a reaction-propulsion system which is effective and efficient for the propulsion of aircraft in the lower speed ranges, for example, from 100 to 200 miles per hour.

Reaction propulsion systems have heretofore been usefully applied only to aircraft operating in the higher speed ranges, for reasons having to do with the efficiency of such systems at various speeds, and it has been generally assumed that these considerations of efficiency prevent the useful application of such systems to aircraft operating at relatively low speeds. It will be obvious that the provision of a reaction propulsion system which is operable and efficient at the lower speed ranges would greatly broaden the field of usefulness of such systems by permitting their application to types of aircraft, such as the light plane designed for personal use, which, it has been assumed, could not be operated by such systems.

It is well known in the art that reaction propulsion systems are efficient in the higher speed ranges. For example, at speeds above 450 miles per hour, they are more efficient than motor-propeller systems. However, the efficiency of such systems decreases rapidly with decreases in speed and at starting speed (zero) the propulsive effect and the efficiency of such systems is very low. The reason for this phenomenon is the known fact that the energy lost by the propulsive system is directly proportional to the difference between the exit speed of the jet discharge and that of the parent body. As the jet discharge must be at high speed, the parent body must be operated at high speed in order to reduce the speed differential to a value low enough to cause the efficiency of the reaction propulsion system to compare favorably with the motor-propeller propulsion system. As the lower speed ranges mentioned above, this speed differential is so great that known reaction propulsion systems have been far too inefficient for actual use.

The present invention has for its principal object the provision of a reaction-propulsion system which will be efficient at the lower speed ranges and will thus make the reaction propulsion system useful in fields in which it has not heretofore been useful.

In carrying out my invention, I make use of a combination of features, some of which are known per se, and which are arranged in combination in a new manner. One of the elements of this combination is an axial flow fan which is positioned entirely within the body of the aircraft and the blades of which operate in a duct of considerable length, the walls of which closely fit the blades. The axial flow fan itself is very efficient at low pressure changes (i. e. comparatively low ratios of exit to entrance pressures) and by placing the fan in a long duct I insure a high velocity inflow to the fan. This combination of features permits the fan blades to be set at a high angle of attack, as they are never required to operate in stagnant air at take-off and therefore cannot stall aerodynamically. The momentum added to the air stream by the blades is added at a higher air stream velocity range, due to higher entrance velocities to the blades, than would be possible in other systems. Thus, for the same momentum increase of this airstream there need be less difference between entrance and exit velocities to the blades than with other systems. This fact enables the blades to be set and work at more efficient angles with higher $L/D$ ratios and thus a greater propulsive efficiency. Thus, the fan blades are set for most efficient operation at cruising speeds and need not be set for most efficient operation at starting speeds, which would be the case if the described combination were not employed. The high angle of attack of the blades, and the positioning of the blades in a closely-fitting duct, permit the use of a fan of very small rotor diameter which, I have found, may be about one-half the diameter of a propeller required to do the same work.

The duct in which the fan blades are housed is extended longitudinally of the aircraft and at its rear end is flared laterally to open to atmosphere through a discharge port the length of which is much greater than the width and which is designed to have a maximum periphery within the limits of practical considerations. This large periphery orifice takes advantage of, and utilizes for forward propulsive effort, what I term "secondary reaction," it being understood that the primary reactive effort of the propulsion system is that following from Newton's second law, i. e., the reaction due to the movement of the mass of discharged air. The secondary reaction results from the fact that the air discharged from the discharge port moves into the surrounding air and is in frictional contact therewith throughout its whole boundary surface. I therefore make this boundary as large as required by providing a discharge port of maximum practical periphery. Preferably this is done by providing a discharge port extending over substantially the entire trailing edge of the horizontal stabilizer or the vertical fin, or both, if the duct extends through the fuselage of the aircraft, but located in any other part of the aircraft to which the duct may lead. The large boundary surface of the jet issuing from such a port is directly influenced by drag, the aerodynamic viscosity of the jet stream boundary layer, or the like, so that the jet affects a much greater volume of free air than if a conventional form of exit port were used. Due to this effect upon a large mass of free air the propulsive efficiency of the system is greatly augmented at starting speed and at low speeds including those within the 100 to 200 M. P. H. range.

The drawings forming part of this application disclose various embodiments of my invention and, in such drawings, Figs. 1, 2 and 3 are side, top and front views, respectively, of an airplane embodying my invention;

Fig. 4 is a longitudinal sectional view from the side of the airplane of Figs. 1, 2 and 3, showing propulsion means according to the invention, and Fig. 5 is a longitudinal sectional view from the top of the airplane of Figs. 1, 2 and 3, showing the propulsion means according to the invention.

An aircraft embodying a propulsion system according to my invention is disclosed in the drawings and comprises a fuselage 2, wings 4, horizontal stabilizer 6 and vertical fin 8. The forward part of the fuselage provides a space 10 for pilot and passengers which is preferably blocked from the rear part of the fuselage by fire-wall 12. It will be observed that this aircraft is not provided with any external propulsive means such as a propeller.

The aircraft disclosed in the drawings is of the small, private-plane type and is therefore generally adapted for flight in the lower speed ranges, such as 100 to 200 M. P. H. The propulsive system provided by this invention for efficiently producing such speeds, as well as speeds in other ranges, comprises a duct 20 which extends within and longitudinally of the fuselage and at its forward end is open to atmosphere whereby it continuously receives a stream of the surrounding air. In the disclosed embodiment of the invention the air intake to the duct is through scoops 22 positioned at opposite sides of the fuselage adjacent the pilot's compartment 10. At its rear end the duct 20 is flared laterally at 24 by communicating with the substantially hollow interior of the horizontal stabilizer 6. The trailing edge of the stabilizer is opened substantially throughout its length to provide a discharge port 26, the length of which is much greater than its height. The discharge port is so constructed and proportioned that it will have a maximum peripheral length consistent with practical considerations imposed by the structure in which it is located. By reason of this, the jet discharged through the port will be in contact with the surrounding air over a surface of maximum area, thereby obtaining maximum benefit from the secondary reactive effort described hereinbefore. The flaring of the duct 20 into the horizontal stabilizer provides surfaces 28 extending laterally of the duct 20 and therefore of the direction of flight and against which the secondary reactive force due to the jet discharge is exerted.

Mounted on the rear of the firewall 12 and substantially centrally disposed with respect to the duct 20 is a motor 50. I preferably surround parts of the motor with a wall 52 which is substantially circular in cross-section and is spaced internally of the external wall 54 of the duct, whereby the duct is of annular shape throughout this part of its length. The cylinders of the engine 50 may extend through openings in the wall 52 and into the duct 20 for cooling purposes. Within the duct the cylinders may be partially surrounded by a cover 53. At the rear end of the wall 52 there is located an axial flow fan comprising a cylindrical hub 55 having substantially the same external diameter as the rear end of wall 52 whereby the annular shape of the duct is continued. Extending radially outwardly from the hub are a plurality of blades 56 having airfoil cross-section and being set at a high angle of attack, for the purpose and with the results hereinbefore described. These blades are of such radial extent that their outer ends are closely adjacent the inner surface of the external wall of the duct, whereby such wall closely fits the blades and the rotating blade system substantially fills the annular duct. The hub of the fan is connected to motor 30 by a shaft and is driven by the motor. Disposed rearwardly of the cylindrical hub of the fan and concentrically with the exterior wall of the duct 20 is a rearwardly-tapering fairing member 58 which at its forward end is of substantially the same diameter as the hub of the fan. Between the external wall of the member 58 and the inner surface of the external wall of the duct, the duct is annular in shape. Rearwardly of the fairing member 58 the duct is circular in section, or of any other desired shape determined by that of the wall of the duct.

In operation, the described and illustrated propulsion system will operate to efficiently propel an aircraft at various speed ranges, including that of 100 to 200 M. P. H. The mechanical operation of the system will be apparent and will involve the operation of engine 50 to force air through the duct 20 and to increase the velocity of air passing into the duct by reason of the forward movement of the aircraft. Air moved rearwardly by the fan passes through the duct and at the rear thereof is deflected laterally by the baffles or airfoils and is thus spread uniformly throughout the passage through the stabilizer and the fin. The jet discharged from the exit port will cause forward propulsion of the aircraft by reason of its primary and secondary reactive effects.

While I have described and illustrated certain embodiments of my invention, it will be apparent to those skilled in the art that other embodiments, as well as modifications of those disclosed, may be made without departing from the spirit or scope of the invention, for the limits of which reference must be had to the appended claim.

What is claimed is:

An aircraft of the reaction propulsion type having a fuselage, wings extending laterally from the fuselage and a vertical fin and horizontal stabilizer mounted on the rear of said fuselage, intake passages connected with intake ports respectively positioned on opposite sides of the fuselage to receive a continuous stream of the surrounding air, an elongated duct extending through a part of the fuselage substantially in the line of flight and being connected with said intake passages, said duct being flared laterally at its trailing end to form an elongated narrow exit port located in the horizontal stabilizer, an engine disposed centrally with respect to the duct having opposed cylinders extending respectively into the intake passages to permit air to pass over the cylinders and cool the same, an axial flow fan driven by said engine disposed entirely in said duct for forcing air therethrough and having blades having high angles of attack operating within and closely fitting the walls of said duct for increasing the velocity and energy of the stream of air flowing through said duct.

FRANK B. LANE.

REFERENCES CITED

The following references are of record in the file of this patent:

UNITED STATES PATENTS

| Number | Name | Date |
|---|---|---|
| 2,396,911 | Anxionnaz | Mar. 19, 1946 |
| 2,405,919 | Whittle | Aug. 13, 1946 |
| 2,420,323 | Meyer | May 13, 1947 |

FOREIGN PATENTS

| Number | Country | Date |
|---|---|---|
| 865,393 | France | Feb. 24, 1941 |
| 427,017 | Great Britain | Jan. 9, 1934 |